United States Patent [19]

Pointon

[11] 4,222,196
[45] Sep. 16, 1980

[54] GARDEN CLOCHE BLANK

[75] Inventor: Peter C. Pointon, Camberley, England

[73] Assignee: Wilkinson Sword Limited, Buckinghamshire, England

[21] Appl. No.: 950,662

[22] Filed: Oct. 12, 1978

[30] Foreign Application Priority Data

Oct. 18, 1977 [GB] United Kingdom ............ 43258/77

[51] Int. Cl.³ ............................................ A01G 13/04
[52] U.S. Cl. ........................................ 47/27; 47/29
[58] Field of Search ............................... 47/26–29

[56] References Cited

U.S. PATENT DOCUMENTS

| 1,866,059 | 7/1932 | Sage | 47/28 |
| 2,626,483 | 1/1953 | Service | 47/29 X |
| 4,100,698 | 7/1978 | Fries | 47/29 |

FOREIGN PATENT DOCUMENTS

| 1069956 | 7/1954 | France | 47/29 |
| 2363981 | 5/1978 | France | 47/27 |
| 7604892 | 5/1977 | Netherlands | 47/29 |
| 729491 | 5/1955 | United Kingdom | 47/27 |

Primary Examiner—Robert E. Bagwill
Attorney, Agent, or Firm—Leydig, Voit, Osann, Mayer & Holt

[57] ABSTRACT

A garden cloche is erected by folding an elongate sheet of transparent plastics material along crease lines preformed in the sheet. These crease lines include a central longitudinal line and at least two outer longitudinal lines permitting the sheet to be folded to form an inverted V shape with watering troughs along the bottom of the roof-shaped sides of the cloche. Moreover, lateral crease lines extending between the central longitudinal crease lines on a zig-zagging outer longitudinal line on each side of the central line alternate in length so that upon folding the sheet, the panels defined between adjacent pairs of crease lines are alternately inclined to one another producing corrugations which strengthen the sides of the cloche.

10 Claims, 5 Drawing Figures

1

GARDEN CLOCHE BLANK

BACKGROUND OF THE INVENTION

This invention relates to cloches for horticultural or agricultural use, commonly referred to as garden cloches. The invention also relates to a garden cloche blank in the form of a sheet of transparent or translucent material such as rigid P.V.C. (polyvinyl chloride), from which a garden cloche can be erected by bending along crease lines preformed in the sheet.

SUMMARY OF THE INVENTION

According to the present invention there is provided a garden cloche blank comprising a flexible sheet of light transmitting material having a complementary pair of parallel spaced zig-zagging crease lines extending longitudinally thereof, and lateral crease lines extending toward the longitudinal centre line of the sheet from the crests and troughs of said zig-zagging lines, such that upon bending the sheet about the crease lines to form the upstanding sides of a cloche therebetween and to form flanges outwardly thereof, the portions of the sheet between the lateral crease lines are alternately inclined to each other and strengthen the cloche.

The present invention also provides a garden cloche blank comprising a flexible sheet of light-transmitting material having longitudinal crease lines extending longitudinally of the sheet, said lines including a central crease line permitting the sheet to be folded to form the sloping sides of an inverted V shaped cloche and outer crease lines permitting the sheet to be folded to form flanges extending outwardly from the base of said sloping sides, said lateral crease lines extending between the central and outer crease lines normal to the central crease line, the lateral lines between the central and outer crease lines alternating in length to cause corrugation of the sloping sides of the sheet upon folding the sheet about said longitudinal crease lines.

The present invention further provides a garden cloche blank comprising a flexible sheet of light-transmitting material having longitudinal crease lines extending longitudinally of the sheet including a central crease line permitting the sheet to be folded to form the sloping sides of an inverted V shaped cloche and outer crease lines permitting the sheet to be folded to form flanges extending outwardly from the base of said sloping sides, said lateral crease lines extending between the central and outer crease lines normal to the central crease line, the lateral lines defining ribs which, in the erected cloche, strengthen the sloping sides of the sheet.

BRIEF DESCRIPTION OF THE DRAWINGS

Two embodiments of garden cloche, and of blanks from which they can be erected, will now be described, by way of example, with reference to the accompanying drawings in which.

DESCRIPTION OF THE PREFERRED EMBODIMENTS

Figure 1:
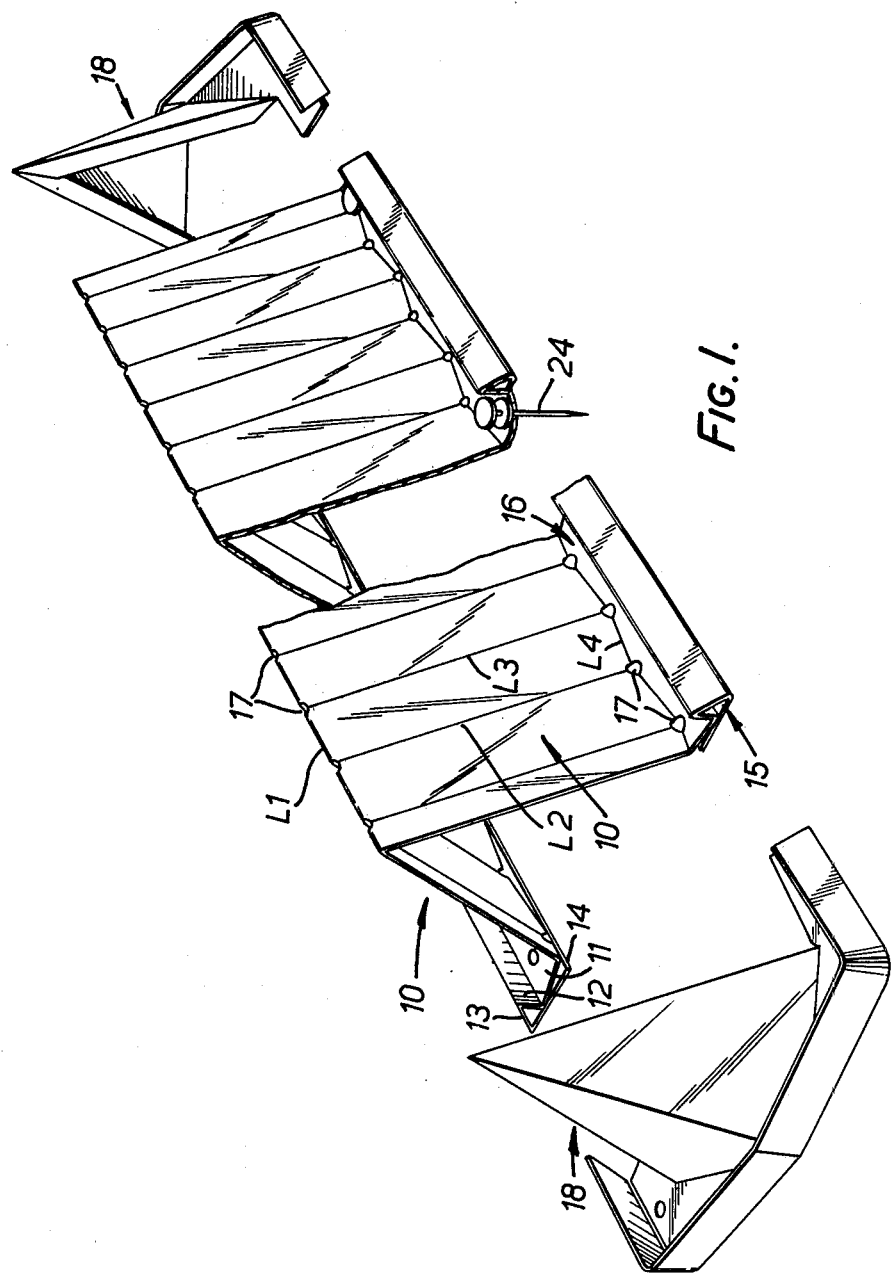
FIG. 1 is an exploded perspective view of a garden cloche together with end closure members adapted to be fitted at the ends of the cloche, or of a series of adjacent cloches, to form a closed close assembly.

An example of the material, from which a cloche blank in accordance with the invention could be formed, is a sheet of transparent or translucent P.V.C. having a thickness of 0.1 mm for a cloche of 65 mm vertical height or of 0.4 mm for a cloche of 150 mm vertical height.

A single cloche is formed from a rectangular flat sheet 9 of the material by folding the sheet along preformed crease lines which are indentations in, or lines of weakness formed in, the flat sheet material. Preferably the crease lines are actual semi-cylindrical deformations of the sheet since, in this way, they not only facilitate folding of the sheet about the line but actually strengthen the sheet against bending. The formation of the crease lines and any other contouring of the sheet is preferably carried out in a vacuum forming process. In this process, a heated sheet of the plastics material is placed on a contoured aluminium former and drawn into contact with the former by vacuum. The shape of the former is set in the sheet as the sheet gives up its heat to the former.

The crease lines extend longitudinally of the sheet, and transversely of the sheet for a limited distance from the centre line of the sheet, the outer ends of the transverse lines on each side of the sheet being interconnected by alternately-inclined oblique lines. The arrangement is such that when the sheet is bent to V shape along the longitudinally extending lines and along the oblique lines, the portions of the sheet lying between the transversely directed lines are forced into a corrugated configuration which imparts substantial bending resistance to the sloping sides 10 of the cloche. The sheet is symmetrical about the centre line.

The disposition of the crease lines will now be considered in greater detail. The crease lines consist of a central longitudinal crease line L1, which in the erected cloche will define the ridge of the inverted V shape, and a plurality of parallel spaced transverse lines L2, L3 of which alternate lines L2 are slightly shorter than the intermediate lines L3, the outer end of the transverse lines being interconnected by oblique lines which adjoin end to end to form two zigzagging longitudinal lines L4 equidistantly spaced from the centre line L1. The longer transverse lines L3 thus interconnect the crests (relative to line L1) of the zig-zag lines L4 and the shorter transverse lines L2 interconnect the troughs of the lines L4. Alternatively lines L2 and L3 could be of equal length, each interconnecting a trough of one line L4 and the crest of the other line L4.

The portions of the sheet outwardly of the lines L4 and which form outwardly directed flanges in the erected cloche, each contain three parallel spaced longitudinal lines L5, L6 and L7. These three lines together with line L4, divide the outer portion of the sheet into four longitudinal panels 11, 12, 13, 14. The line L5 which is nearest to the zigzag line L4, is such as to facilitate bending of the sheet material outwardly thereof in an upward direction, i.e. in the direction of the ridge of the erected cloche. The next adjacent line L6 is designed to facilitate folding of the sheet material outwardly thereof in a downward direction. The outermost crease line L7 is designed to enable the sheet material outwardly thereof to be folded underneath so that the three panels 12, 13, 14 define a prism shaped beading 15 along each outer edge of the cloche and spaced from the upwardly inclined adjacent side 10 of the cloche by panel 11 which thus forms the bottom of a watering channel or gutter 16.

At the junctions of the transverse crease lines L2 and L3 and the oblique crease lines L4, and at the junction of the transverse lines L2 and L3 with the central crease line L1, the sheet material is punched to leave holes 17. These holes facilitate folding of the material and those at the ridge will also assist ventilation. The holes 17 along the lines L4 will permit water flowing down the sides 10 of the cloche and collected in the gutter 16 to pass through into the ground within the cloche, rather than be drained outwardly away from the cloche. Moreover the space within the prism shaped beading 15 and the narrow core capillary gap between panels 11 and 14 will trap water and release it slowly into the air within the cloche.

Figure 3:
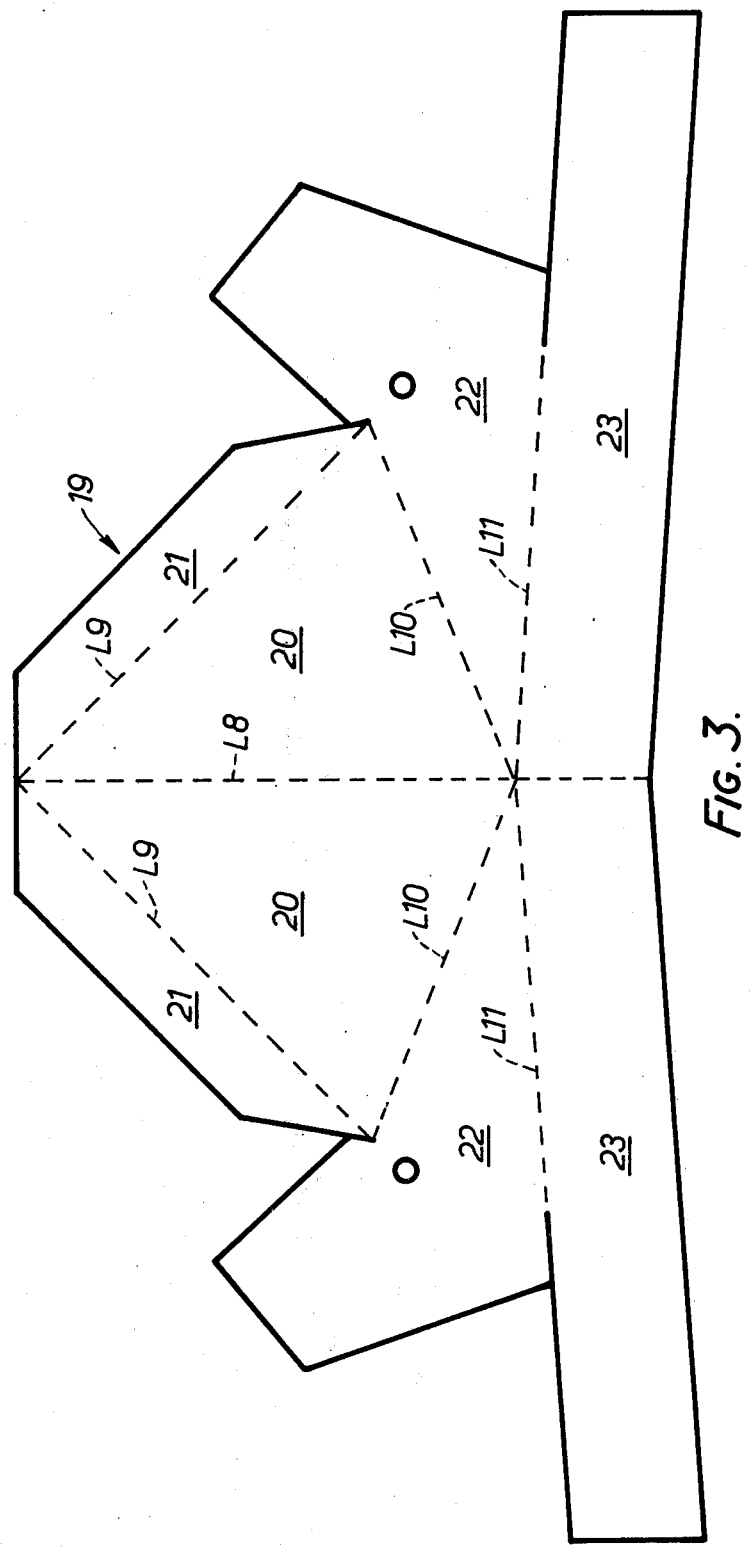
FIG. 3 is a plan view of a sheet of material shaped, and with crease lines, for forming an end closure to the cloche.

End sections 18 for closing the ends of a single cloche, or of a series of adjacent cloches, can be formed from a sheet of material 19 cut to the shape illustrated in FIG. 3. This sheet, which is symetrical about a central crease line L8, comprises two triangular panels 20 each defined by the central crease line L8, a second crease line L9 whose length corresponds to that of one sloping side of the cloche and a third crease line L10 which, in the finished cloche, will engage the ground. Outwardly of crease line L9 is a narrow panel 21 which, when bent approximately perpendicular to the plane of panel 20, strengthens the sloping edge of the end section.

Adjacent the triangular panel 20 is a wedge shaped ground-engaging panel 22 having outwardly thereof a narrow panel 23 separated from the wedge panel 22 by a crease line L11. Crease line L11 enables panel 23 to be folded upwardly to define a channel whose base is formed by the wedge shaped panel 22. The outer portion of the panel 23 forms a tongue which is free to bend and is of a width which enables it to be fitted into the adjacent open end of the prism shaped beading 15 of the adjacent cloche to assist in securing the end section 18 in position.

In assembling a cloche, the sheet 9 of material is first bent about its central crease line L1 to a simple inverted V shape and the outer edge portions are then bent about the three outer longitudinal crease lines L5, L6 and L7 to form the prism shaped edge beading 15 of the cloche. Finally each outer portion is bent along the zigzag crease line L4 to impart a corrugated shape to the inclined roof-forming sides 10 of the cloche. Each cloche can be anchored to the ground by pins 24 pushed through holes preformed, or formed by the pins, at spaced positions along the gutter 16. The gutters of the cloche can be fixed at a desired spacing from each other if the cloche is to remain open ended. This spacing however must match the dimensions of the end sections if the latter are to be fitted to the cloche as illustrated in FIG. 1.

The end section shown in FIG. 3 is erected by folding panels 20 and 23 about the adjacent crease lines L10 and L11 on opposite sides of the wedge shaped panel 22. Then the panels 20 are folded about the central crease line L8. Finally the tongue-shaped ends of panels 23 are bent to fit into the open ends of the prism shaped edge beadings 15 of the adjacent cloche. The free ends of the wedge panel 22 can be sandwiched between the adjacent panels 11 and 14 in the edge portion of the cloche to assist in securing the end section to the cloche. These panels 22 are additionally secured by pins passed through the panels 22 and through the gutter 16 into the ground.

Although the cloches can be made of any suitable size subject to the rigidity of the sheet material used, a typical sheet has the following dimensions:

| | | |
|---|---|---|
| width of sheet | | 364 mm |
| spacing between transverse crease lines | | 50 mm |
| length of transverse crease lines | L2 | 152 mm |
| | L3 | 160 mm |
| distance of central crease line | L1 from | |
| longitudinal crease lines | L5 | 100 mm |
| | L6 | 116 mm |
| | L7 | 140 mm |

The dimensions of the end section will be dictated by the dimensions of the cloche to which they are to be fitted.

Although P.V.C. is the preferred material for the construction of the cloche in this country and others of equable climate, polycarbonate is more suitable where sustained temperatures over 100° F. will be experienced. As an alternative to polycarbonate, a polyester material such as Melinex or Mylar (Registered Trade Marks) can be used which has been stabilised to resist the degrading effect of long-term exposure to sunlight at high ambient temperatures.

Cloches and end closures for cloches in accordance with the invention can be sold in flat sheet form ready for erection.

Alternatively they can be sold in a fully erected form, or in a partially erected form in which they can be more readily stacked.

For example the cloches could be stacked with the gutter edges preformed, the remainder being flat. Again, when not in use, the cloches and end closures can be partially or completely unfolded to facilitate storage.

In the case in which the cloches are sold with the gutter edges preformed to prism shape, the panels 11 and 14 could be permanently secured together, for example by spot welding.

Figure 4:
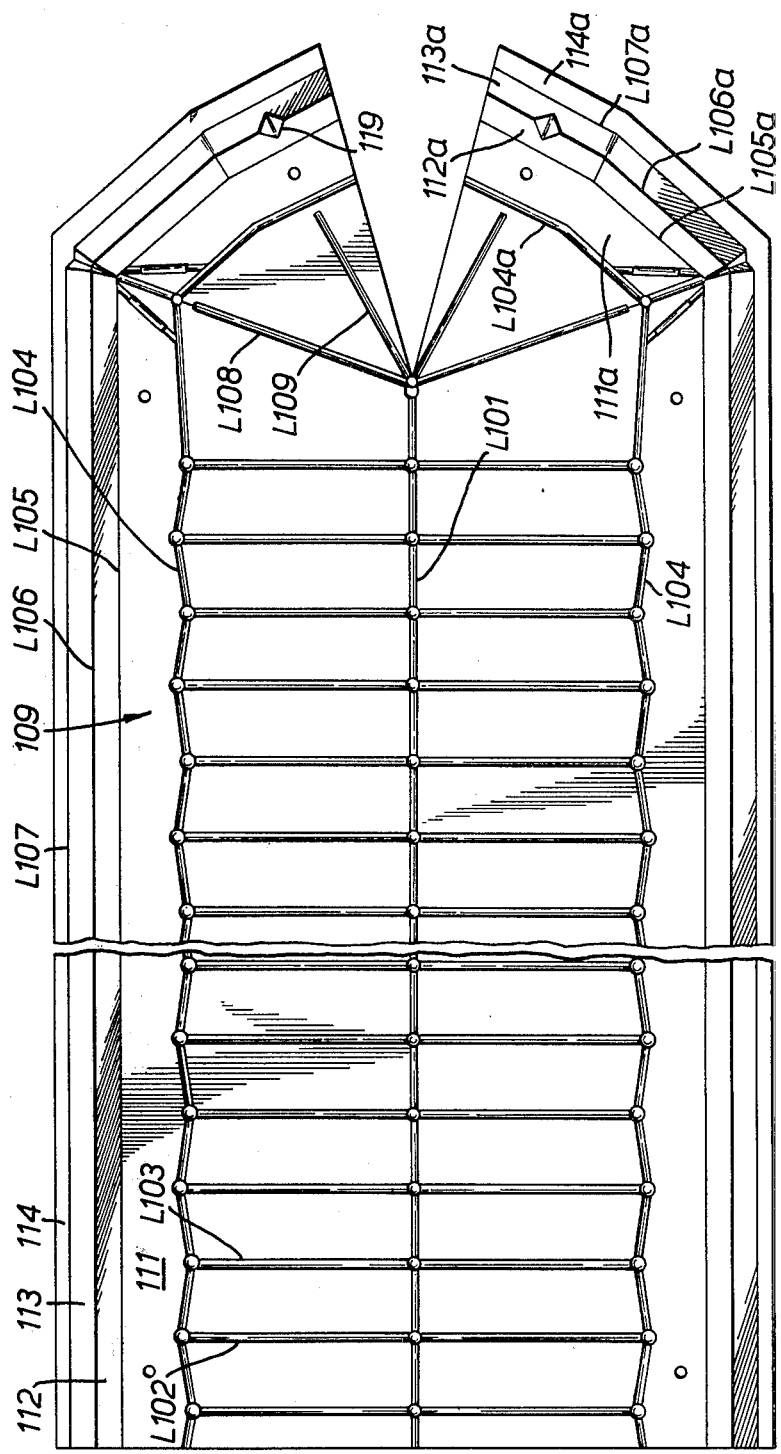
FIG. 4 is a plan view of a second form of garden cloche blank.
Figure 5:
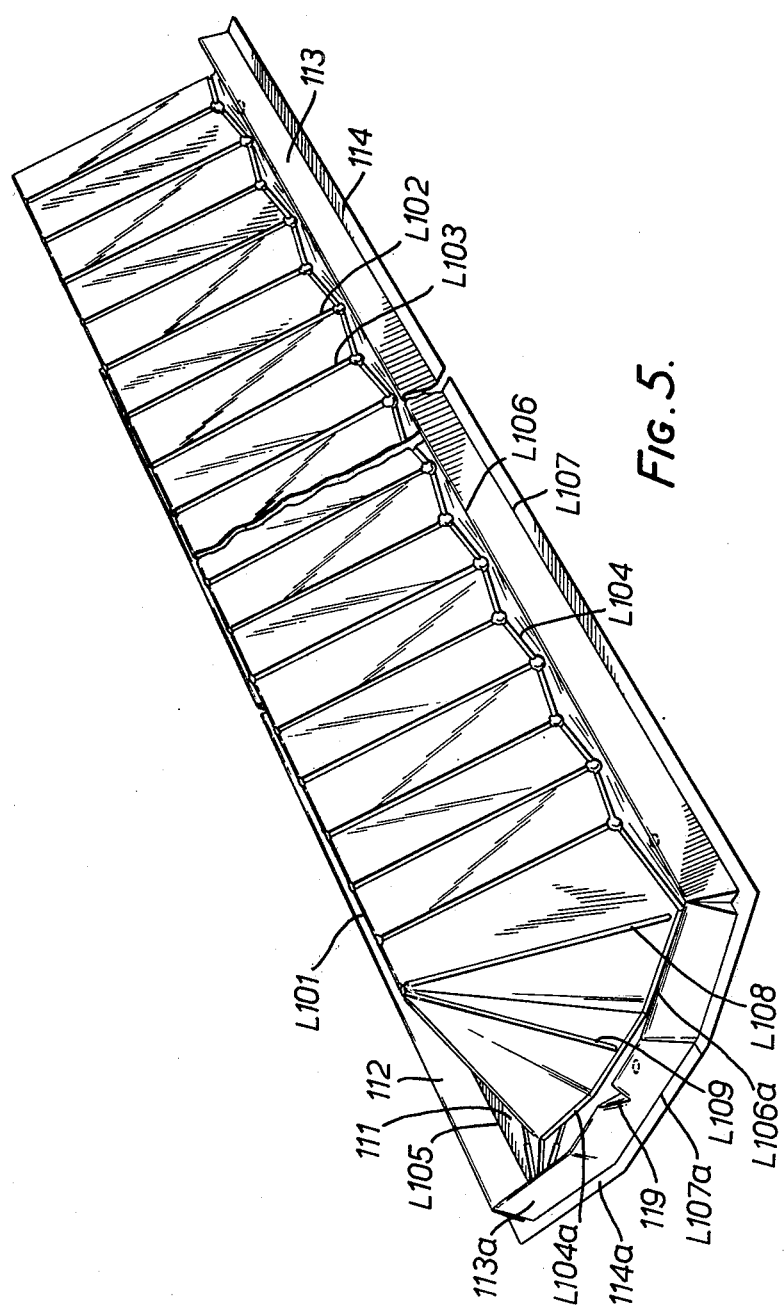
FIG. 5 is a perspective view of a garden cloche erected from the blank of FIG. 4.

The second embodiment of garden cloche blank illustrated in FIGS. 4 and 5, is similar to the first embodiment in the formation of corrugated sloping sides of a cloche but differs with regard to the formation of the watering trough and the end closure.

Figure 2:
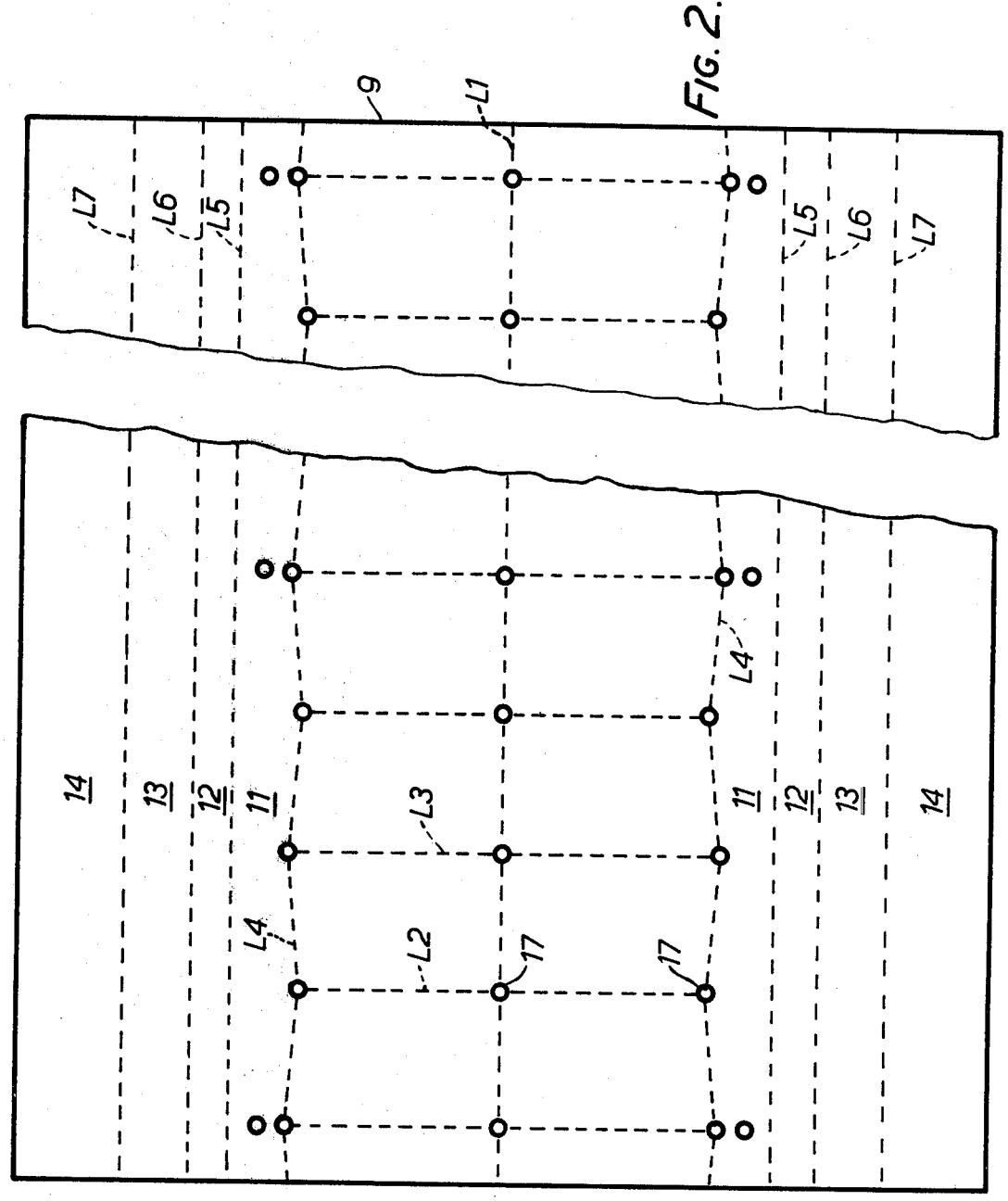
FIG. 2 is a plan view of a sheet of material forming a garden cloche blank and showing the arrangement of its crease lines for erecting the cloche of FIG. 1.

As shown in FIG. 4, the sheet of light-transmitting material 109 is formed with a central crease line L101 and, perpendicular thereto, parallel spaced lateral crease lines L102 and L103, interconnecting the troughs and crests of two parallel-spaced zig-zag crease lines L104, all corresponding respectively with the lines L1, L2, L3 and L4 of FIG. 2.

The portions of the sheet outwardly of lines L104 are divided by lines L105, L106 and L107 to form panels 111, 112, 113 and 114. In this embodiment panels 112 and 113 are of equal width and lines L105, L106 and L107 are not crease lines but permanent fold lines such that panels 112 and 113 form an inverted V whereas panels 111 and 114 lie in the plane of the blank.

At one end of the sheet, extensions are provided integrally with the sheet which form flaps capable of being folded into mutually overlapping relationship to close one end of the cloche. These extensions can easily be cut off if the cloche is to form an intermediate cloche in a series of three or more.

Each of the extensions is formed by a substantially triangular sheet portion integral with one end of the main sheet portion and having its apex at the adjacent end of line L101, the extension having a crease line L108 extending at an angle of 110° to line L101 to define a hinge about which the extension can fold. One or more further crease lines L109 extending from the end of line L101 can be formed as required to strengthen the flap.

The crease lines L104 and the permanent fold lines L105, L106 and L107 are extended into the extensions as lines L104a, L105a, L106a and L107a between which panels 111a, 112a, 113a and 114a are formed. These lines are roughly arcuate about the end of line L101, but since the sheet cannot be bent to the desired configuration as shown in FIG. 5 without excess material being formed in panels 111 and 113 at their junction with the extension panels 111a and 113a, some deep indentations are formed in the sheet material at these junctions to accommodate this excess material during bending of the sheet.

To assist in locating the extensions in overlapping relationship, a depression 119 can be formed in the panels 112a, 113a at their junction with line L106a, so that interengagement of the two depressions 119 will lock the flaps together.

Although in illustrated embodiments of the invention, the cloche blanks are formed to produce corrugations upon erection of the cloche, in a modification of the invention, not shown, lateral crease lines, possibly of equal length, are formed in the sheet in the shape of semi-cylindrical ribs which, in the erected cloche, provide adequate strength to the sides of the cloche without the necessity for any other form of corrugation. The semi-cylindrical ribs can be of semi-circular, or V shaped or other suitable cross-sectional shape.

I claim:

1. A garden cloche blank comprising
a flexible elongate sheet of light-transmitting material, the sheet having
a central crease line extending longitudinally of the sheet,
a complementary pair of parallel spaced zig-zagging crease lines extending longitudinally of the sheet and each defining a plurality of crests and troughs and
lateral crease lines extending toward the central crease line of the sheet from the crests and troughs of said zig-zagging lines,
the arrangement of the lines being such that upon bending the sheet about the crease lines to form the upstanding sides of a cloche therebetween and to form flanges outwardly thereof, the portions of the sheet between the lateral crease lines are alternately inclined to each other and strengthen the cloche.

2. A garden cloche blank according to claim 1 wherein each lateral crease line terminates at the central crease line of the sheet.

3. A garden cloche blank comprising
a flexible elongate sheet of light-transmitting material having
longitudinal crease lines extending longitudinally of the sheet including
a central crease line permitting the sheet to be folded to form the sloping sides of an inverted V shaped cloche and
outer crease lines parallel to the central crease line and permitting the sheet to be foleded to form flanges extending outwardly from the base of said sloping sides, and
lateral crease lines extending between the central and outer crease lines normal to the central crease line, the lateral lines between the central and outer crease lines alternating in length to cause corrugation of the sloping sides of the sheet upon folding the sheet about said longitudinal crease lines.

4. A garden cloche blank according to claim 3 wherein said outer crease lines are complementary zig-zagging lines, the alternate lateral crease lines extending between the crests of the zig-zagging lines and the intermediate lateral crease lines extending between the troughs of the zig-zagging lines.

5. A garden cloche blank comprising
a flexible elongate sheet of light-transmitting material having
longitudinal crease lines extending longitudinally of the sheet including
a central crease line permitting the sheet to be folded to form the sloping sides of an inverted V shaped cloche and
outer crease lines parallel to the central crease line and permitting the sheet to be folded to form flanges extending outwardly from the base of said sloping sides, and
lateral crease lines extending between the central and outer crease lines normal to the central crease line, the lateral lines defining ribs which, in the erected cloche, strengthen the sloping sides of the sheet,
and wherein a longitudinal portion of each flange is permanently bent out of the plane of the remainder of the flange to strengthen the flange and, in the erected cloche, to co-operate with the remainder of the flange and with the adjacent sloping side of the cloche to form a watering trough, there being apertures at the junctions of at least certain of said lateral and outer crease lines to enable the water in said trough to irrigate the plants beneath said cloche.

6. A garden cloche blank according to claim 1 wherein a longitudinal portion of each flange is permanently bent out of the plane of the remainder of the flange to strengthen the flange and, in the erected cloche, to co-operate with the remainder of the flange and with the adjacent sloping side of the cloche to form a watering trough.

7. A garden cloche blank according to claim 1 wherein, at one end of said sheet, integral flap-forming means are provided capable of being folded to close the erected cloche at said end of the sheet.

8. A garden cloche blank according to claim 7 wherein said flap-forming means are formed on each side of the sheet and can be brought into mutual overlapping relationship in the erected cloche.

9. A garden cloche blank according to claim 1 wherein apertures are provided in the sheet at at least some junctions of crease lines.

10. A garden cloche blank according to claim 1 having perforations in the flanges for the reception of cloche anchoring means.

* * * * *